Dec. 13, 1932.   C. G. ANDREASEN ET AL   1,890,716
METHOD AND MEANS FOR LATERAL TRANSFER OF AUTOMOTIVE VEHICLES
Filed May 20, 1931    2 Sheets-Sheet 1

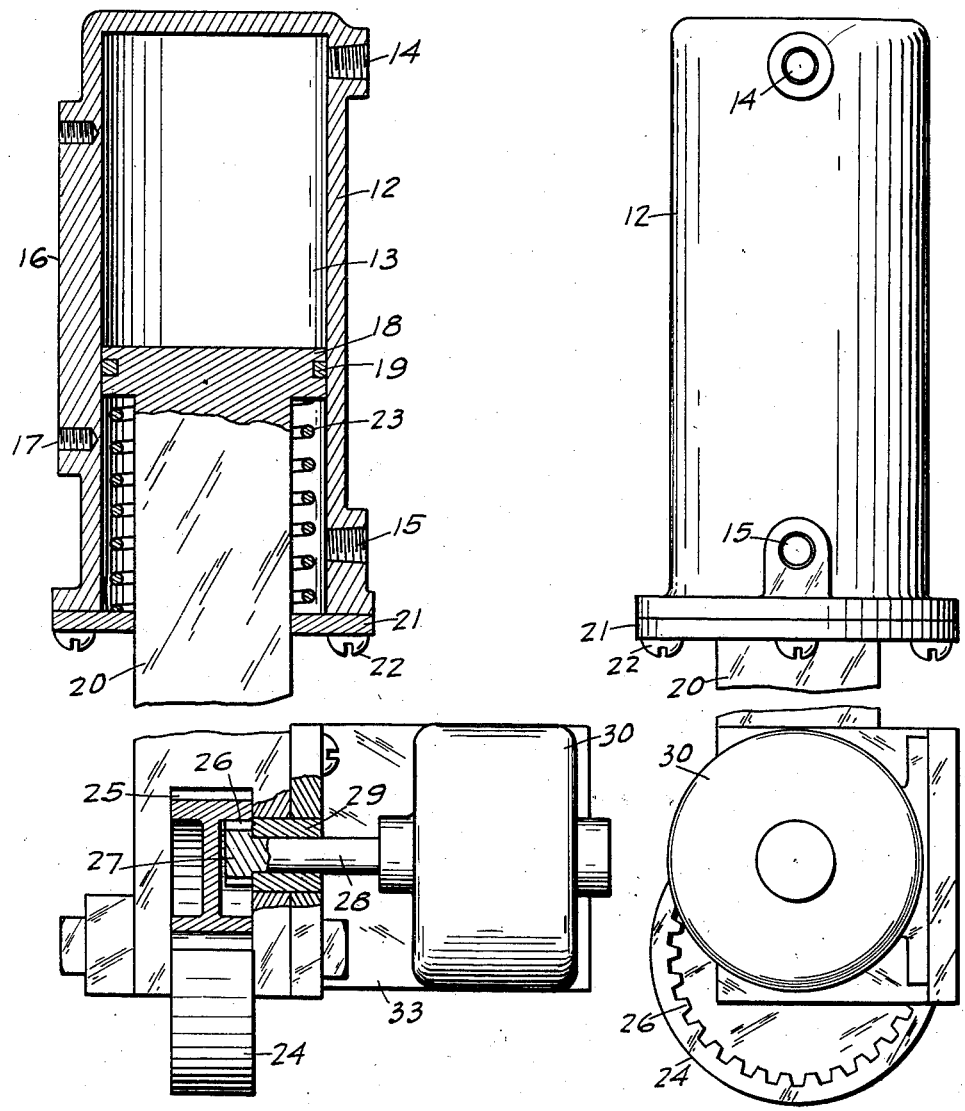

Patented Dec. 13, 1932

1,890,716

UNITED STATES PATENT OFFICE

CLAUDE G. ANDREASEN, OF OAKLAND, AND RAYMOND N. ANDREASEN, OF SAN LEANDRO, CALIFORNIA

METHOD AND MEANS FOR LATERAL TRANSFER OF AUTOMOTIVE VEHICLES

Application filed May 20, 1931. Serial No. 538,722.

This invention is a method and means for lateral transfer of automotive vehicles, and has special reference to means for moving automotive vehicles into and out of close quarters, it being possible by my method to park a car within a space equal to its own length.

The objects of the invention are

First: to provide a method and means for moving an automotive vehicle laterally into and out of parking spaces under its own power, whereby the vehicle may be parked in a space substantially equal to its own length.

Second: to provide a means as outlined which may be used for raising the car to clear the road so tire changes can be made, the raising means being independently operated for front and rear of the car.

Third: to provide a means as outlined which may be controlled from the instrument board of the vehicle, and operated under the power of the engine and/or battery.

Fourth: to provide such means which, when not in use, is retracted to provide necessary road clearance, and which is at all times available for instant use.

Fifth: to provide such means which is inexpensive to manufacture and which may be applied to existing vehicles, and made a standard part of newly manufactured vehicles.

The means covered by this application is adaptable to a variety of uses, such as moving a car out of a congested space, as a jack for changing tires or other repairs, as a jack for raising and supporting the car off the tires, as means for turning the car around in its own length and for swinging either end of the car around.

Other objects and advantages of the invention will become apparent as the following description is read on the drawings forming a part of this specification and in which similar reference characters are used to indicate similar parts throughout the several views, and in which Fig. 1 is a side sectional elevation of the running gear of a vehicle with my invention applied thereto;

Fig. 4 is a side elevation of the invention partly in section; and

Fig. 5 is a rear elevation of the invention.

Figure 1:
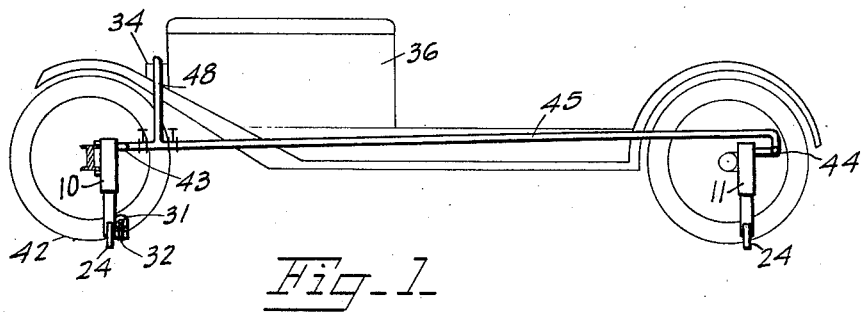

The invention consists in providing a plurality of jacks 10 and 11 at opposite ends of a vehicle, which are operated by power derived from the automobile motor preferably, although a separate power plant could just as readily be used. Any type of jack may be used which is provided with a road wheel, although a desirable form of jack is shown in Figs. 4 and 5 in which a cylinder 12 is provided with a bore 13, a fluid inlet 14, and an aperture 15 which may consist of a breather hole or a fluid passage. A pad 16 is provided with mounting holes 17 although this mounting feature may not be applicable to all cases under which conditions a special type of pad or a bracket may be required.

Slidably fitted in the bore 13 is a piston 18 which is provided with packing 19 and has an integral piston rod 20 which is preferably non-circular to prevent rotation of the rod which is slidable in the head 21, which in turn is secured to the cylinder 12 by means of screws 22. A spring 23 cooperates between the under surface of the piston 18 and the head 21, for normally retracting the rod 20. A caster wheel 24 is pivotally mounted at the lower end of the rod 20 in a slot 25 and has teeth 26 formed on the inner periphery of the rim with which a pinion 27 meshes, the pinion being formed integral with a shaft 28 which is rotatably mounted in a bearing 29. The pinion may be driven by a motor 30 with current derived from the vehicle battery, or by fluid or other power devices, and may also be provided with suitable reduction gearing as indicated in Fig. 1 in which the pinion is driven by means of a worm 31 and worm wheel 32. The motor 30 is mounted on a suitable bracket 33 which is secured to, or integral with the rod 20.

Figure 2:
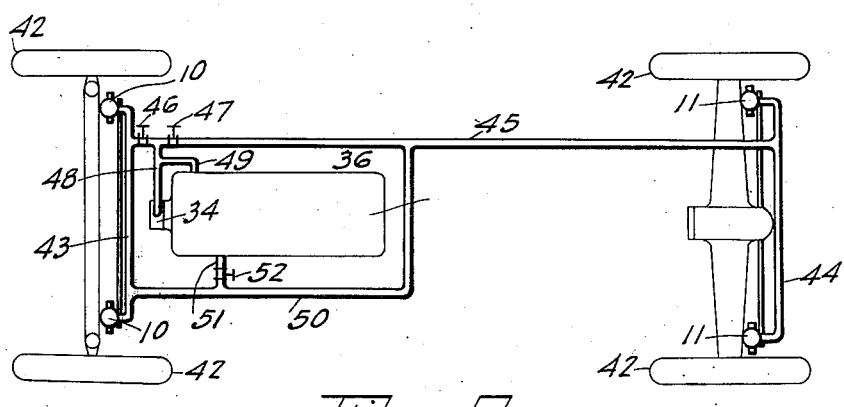
Fig. 2 is a top plan view of Fig. 1.

Jacks are mounted substantially as indicated in Figs. 1 and 2, a jack being mounted adjacent each wheel on the front and rear axles as indicated at 10 and 11.

Figure 3:
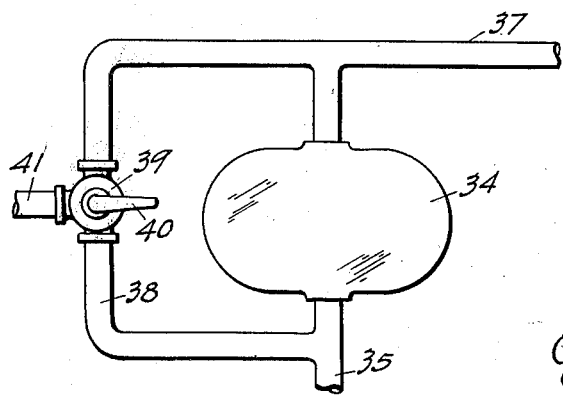
Fig. 3 is a controlling method for the invention, power being derived from the automobile motor oil circulating pump.

Power for operating the jacks is derived from the vehicle oil pump indicated at 34 which pumps oil from the oil sumps beneath the engine. A hookup is indicated in Fig. 3 in which a gear pump 34 pumps oil from a supply tank through pipe 35, delivering the oil to the engine 36 through a pipe 37 in the usual manner. A shunt pipe 38 has an interposed three way valve 39 with an operating lever 40, and a branch pipe 41 communicates with the cylinder bore 13 through aperture 14, Fig. 4. By turning lever 40 in one direction, oil from the pump 34 is simultaneously forced through pipe 37 to the engine and through pipe 41 to the jack cylinder, which forces piston 18 down against the urgence of spring 23, until the car wheel 42 is raised off the supporting surface. By turning the lever 40 in the other direction all oil is forced from the pump through pipe 37 to the engine and the spring 23 forcing the piston upwardly forces the oil from cylinder 13 through pipe 38 and 35 to the sump.

An operable system is indicated in Figs. 1 and 2 in which the two jacks 10 are connected by a pipe 43 and two jacks 11 are connected by another pipe 44, pipes 43 and 44 being connected by a pipe 45 which has two valves 46 and 47 with interposed supply pipe 48 leading from the pump 34, a branch pipe 49 from pipe 48 supplying the engine. A release pipe 50 connects to the pipes 43 and 44 or 45 on opposite sides of valves 46 and 47, and has a branch 51 for draining oil back to sump, a valve 52 being provided for closing this pipe.

Controls for the various valves and motors may be mounted on the instrument board of the vehicle, the motors on each side of the vehicle being adapted to run in a direction to move the vehicle toward that side.

The operation of the invention is as follows. With the motor 36 running, valves 46 and 47 are opened and valve 52 closed. Oil is pumped into cylinders 14 forcing the pistons 20 down until the car is raised off its wheels. The motors 30 on the side toward which direction it is desired to move the car are cut in circuit and the car is moved on the casters 24 which are positively driven. When the car has been moved to the desired position, the motors 30 are switched out of circuit, and valves 46 and 47 are closed and valve 52 opened, the oil flowing from the cylinders back to sump through pipes 50 and 51, the spring retracting the piston rod 20 and caster 24, lowering the vehicle onto its road wheels.

By opening only one of the valves 46 or 47, either the front or rear end of the vehicle may be raised for changing tires or similar purposes.

Having described an operative method of constructing and using the device, it will be understood that variations in construction and arrangement which are consistent with the appended claims may be resorted to without detracting from the spirit or scope of the invention or sacrificing any of the advantages thereof.

We claim:—

1. In combination with a vehicle, transfer means for said vehicle comprising a cylinder secured to the axle of the vehicle, a piston in said cylinder, a rectangular piston rod operating through a rectangular aperture in the head of said cylinder, resilient means for raising said piston, a road wheel pivoted at the lower end of said piston rod, said wheel having internal gear teeth formed therein, a pinion cooperating with said internal gear teeth, a bracket secured to said piston rod and an electric motor mounted on said bracket, said pinion being mounted on the shaft of said motor.

2. A jack and traversing unit comprising in combination with an electric motor, a cylinder, a piston in said cylinder fluid actuated in one direction and spring urged in the other direction, a piston rod slidable and non-rotatable relative to the cylinder, a traction wheel mounted at the outer end of said piston rod, a bracket mounted on said piston rod for supporting said electric motor, internal gear teeth formed in said traction wheel, a pinion cooperating with said internal gear teeth and mounted on the motor shaft and a bearing for the motor shaft extending through the bracket and adjacent portion of the piston rod.

In testimony whereof we have affixed our signatures.

CLAUDE G. ANDREASEN.
RAYMOND N. ANDREASEN.